United States Patent [19]
Galvanauskas et al.

[11] Patent Number: 5,499,134
[45] Date of Patent: Mar. 12, 1996

[54] OPTICAL PULSE AMPLIFICATION USING CHIRPED BRAGG GRATINGS

[75] Inventors: Almantas Galvanauskas; Martin E. Fermann, both of Ann Arbor, Mich.

[73] Assignee: Imra America, Ann Arbor, Mich.

[21] Appl. No.: 294,969

[22] Filed: Aug. 24, 1994

[51] Int. Cl.[6] .................................................. H01S 3/00
[52] U.S. Cl. .................................................... 359/333
[58] Field of Search .............................. 359/333, 347, 359/348, 349

[56] References Cited

U.S. PATENT DOCUMENTS 5,271,024  12/1993  Huber .................................... 359/341 X
5,283,686   2/1994  Huber ...................................... 359/337

OTHER PUBLICATIONS

D. Strickland and G. Mourou, Optics Communications, 56, 219 (1985).
A. Galvanauskas, M. E. Fermann, P. Blixt, J. T. Tellefsen, D. Harter, Optics Lett. 19, 1043 (1994).
E. E. Treacy, IEEE Journal of Quantum Electronics QE-5, 454 (1969).
O. E. Martinez, IEEE Journal of Quantum Electronics QE-23, 59 (1987).
M. E. Fermann, A. Galvanauskas, and D. Harter, Applied Physics Lett. 64, 1315 (1994).
F. Ouellette, Optics Lett. 12, 847 (1987).
G. Meltz, W. W. Morey, and W. H. Glenn, Optics Letter 14, 823 (1989).
P. J. Lemaire, R. M. Atkins, V. Mizrahi, and W. A. Reed, Electr. Lett 29, 1191 (1993).
T. Tamir, ed., Integrated Optics (Springer–Verlag, New York, 1979) Chap. 2.
F. Ouellette, Optics Lett. 16, 303 (1991).
K. Sugden, I. Bennion, A. Molony and N. J. Copner, Electr. Lett. 30, 440 (1994).

*Primary Examiner*—Mark Hellner
*Attorney, Agent, or Firm*—Sughrue, Mion, Zinn, Macpeak & Seas

[57] ABSTRACT

Chirped Bragg gratings are used both for stretching and compressing of ultrashort optical pulses in a chirped pulse amplification system, so that even femtosecond pulses can be stretched and recompressed back to their initial shape and duration. When used in chirped pulse amplification systems instead of bulk diffraction grating stretchers and compressors, Bragg gratings offer unprecedented compactness, robustness and system efficiency.

18 Claims, 11 Drawing Sheets

OPTICAL PULSE AMPLIFICATION USING CHIRPED BRAGG GRATINGS

FIELD OF THE INVENTION

The present invention is directed to a method and apparatus for stretching ultrashort optical pulses before amplification and subsequently recompressing the amplified pulses to avoid amplification distortion; and more particularly, to the use of chirped Bragg gratings to perform the stretching and recompressing functions.

BACKGROUND OF THE INVENTION

Compact fiber and diode sources of ultrashort optical pulses have not been able to produce significant pulse energies compared with their large-frame solid-state counterparts. The pulse energies from diode and fiber lasers vary typically between several picojoules and the nanojoule level, at best. These limited energies are not sufficient for a broad range of practical applications in which the use of compact ultrashort-pulse sources is highly desirable.

Potentially, much higher pulse energies can be extracted from rare-earth-doped fiber amplifiers. For example, the saturation energies of single-mode erbium-doped fiber amplifiers (EDFA's) are approximately 1 µJ. However, at such energies the peak power of the amplified ultrashort pulses would become unacceptably high for a single-mode fiber (approximately 1 MW for a 1-ps pulse). If light of such high power were confined in the small core of a fiber, high peak intensities would result, which would inevitably lead to strong nonlinear effects and pulse breakup. The only way to avoid this problem is to maintain sufficiently low peak powers in the amplifier, i.e., to amplify stretched, relatively long pulses. Provided that the initial pulses have a broad bandwidth and are suitably chirped, a short pulse duration can be attained by linear compression of the amplified pulses (e.g., by use of diffraction gratings).

Chirped pulse amplification methods are used in most of the laser systems producing high energy ultrashort pulses. For the last decade, chirped pulse amplification systems have relied on bulk diffraction-grating stretchers and compressors. The idea of chirped pulse amplification is that an ultrashort optical pulse is stretched prior to amplification and then recompressed back to its original width after the amplification is completed. This processing allows for a reduction in the distortion of the ultrashort pulses in the amplifier, and high pulse energies while maintaining short pulse durations. Recently, chirped long pulses were generated directly from a tunable laser source prior to amplification, and ultrashort high energy pulses were obtained by compressing the amplified pulses. A detailed discussion of this technique can be found in Galvanauskas et al., "Hybrid diode-laser fiber-amplifier source of high-energy ultrashort pulses," 19 Optics Letters 1043 (1994), which is hereby incorporated by reference. Although this method eliminates the need for the grating stretcher, it still requires a diffraction grating compressor.

In conventional systems, diffraction grating stretchers and compressors were the only type of dispersive delay line suitable for practical chirped pulse amplification systems. By using different configurations, both negative and positive dispersions can be attained. The magnitude of the dispersion is sufficient to stretch/recompress optical pulses by tens and hundreds of times, i.e., from femtoseconds to tens and hundreds of picoseconds. Such diffraction grating arrangements can handle pulses with very high energies without any pulse distortion due to nonlinear optical effects.

However, such dispersive delay lines have several major drawbacks: diffraction grating arrangements are polarization sensitive and typically large (up to a few meters long), have limited robustness and energy throughput (due to the diffraction losses), and distort the profile of the output beam. These features are particularly undesirable in compact fiber and laser-diode based chirped pulse amplification systems.

Bragg gratings have been used for various other purposes in optical signal processing, such as acousto-optical filters, as discussed in Tamir, *Integrated Optics* (Springer-Verlay New York, 1979) (hereby incorporated by reference) and as dispersive elements. Bragg gratings can be fabricated in optical fibers, in integrated optical waveguide structures, and in bulk materials. A Bragg grating in a germanosilicate fiber can be formed in the core via a light-induced periodic refractive-index change. The grating can be directly patterned from the side of a fiber using ultraviolet light, as discussed in Meltz, "Formation of Bragg gratings in optical fibers by a transverse holographic method," *Optics Letters*, Vol. 14, No. 15, Aug. 1, 1989, p. 823, the disclosure of which is hereby incorporated by reference. Using photosensitivity enhancing techniques, gratings can be written in any germanosilicate fiber, including standard telecommunications fibers. Optical waveguide gratings can be directly grown using a semiconductor material, and are most often used as integral parts of semiconductor laser structures (e.g., distributed Bragg reflector DBR or distributed feedback DFB laser diodes). However, other materials (e.g., $LiTaO_3$ or $LiNbO_3$) are also used for integrated waveguide structures including various grating structures. An example of a bulk Bragg grating is an acoustical optical filter. By chirping the FR modulating electric waveform, a chirped Bragg grating can be obtained.

Figure 1:
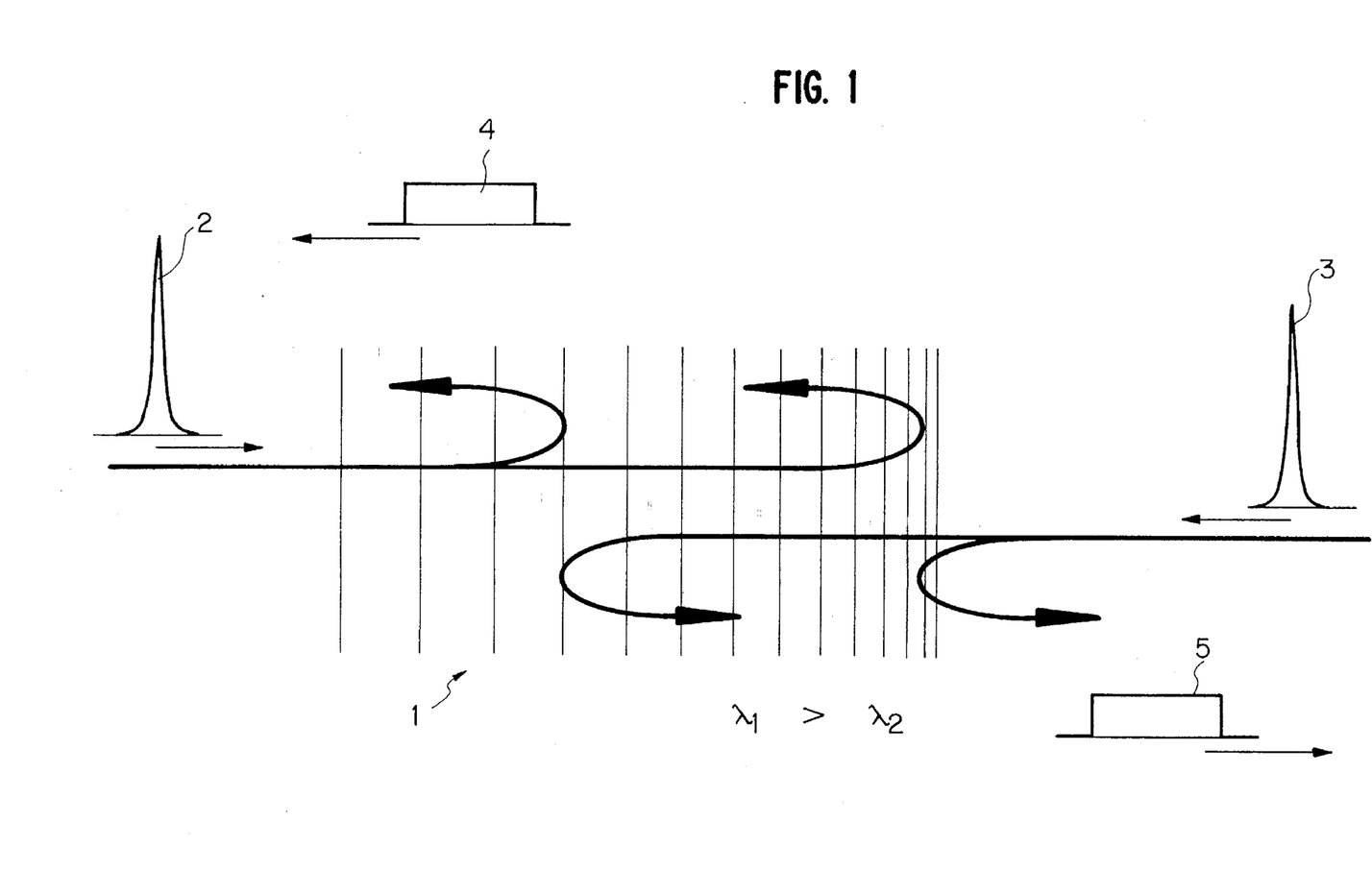
FIG. 1 illustrates the principle of pulse chirping in a Bragg grating.

Recently chirped Bragg gratings have also been used to compensate for dispersion in optical waveguides, as illustrated in FIG. 1 and described in detail in Ouellette, F. "Dispersion cancellation using linearly chirped Bragg grating filters in optical waveguides." *Optics Letters* Vol. 12, No. 10, October 1987, p. 847, hereby incorporated by reference. Since optical waves travel at rates which depend on their frequencies, different frequency waves reach a given destination at different times, thus creating a dispersion problem. By installing Bragg grating filters in the waveguide, this dispersion problem can be greatly reduced.

As discussed in Ouellette, the wavelength $\lambda_B$ of an optical wave reflected from a periodic Bragg structure is $\lambda_B = 2n\Lambda$, where $\Lambda$ is the period and n is the refractive index of the structure. If the period of such a structure varies along the grating, optical waves with different wavelengths are reflected at different positions. This gives a wavelength dependent delay $\tau_\lambda$:

$$\tau_\lambda = 2L/v_g$$

Here $V_g$ is the group velocity of light in the structure and L is the distance an optical wave of wavelength $\lambda$ penetrates into the Bragg grating. Therefore, the length of the Bragg grating determines the maximum delay difference between two different wavelengths and the magnitude of the grating period variation (grating chirp) determines the reflection bandwidth of the structure. The maximum $\tau_\lambda$ for a few-centimeter-long structure can be hundreds of picoseconds and the bandwidth can reach a few tens of nanometers.

While fiber Bragg gratings have been used as optical filters and chirped fiber Bragg gratings have also been used dispersion compensating components dispersive elements, the amplification of ultrashort optical pulses has been limited to using large and inefficient diffraction grating stretchers and compressors.

SUMMARY OF THE INVENTION

It is an object of the present invention to use chirped Bragg reflection gratings in chirped pulse amplification systems to eliminate the above stated drawbacks of diffraction grating arrangements and to make such systems compact, robust, reliable and cost effective.

It is another object of the present invention to use in-fiber chirped Bragg gratings as dispersive components which stretch and recompress femtosecond pulses without any large loss of pulse quality and shape.

It is a further object of the present invention to employ Bragg gratings to achieve maximum energy throughput and minimum loss in pulse quality and duration.

It is another object of the present invention to use opposite propagation directions in a chirped Bragg grating for stretching and recompressing ultrashort optical pulses in a chirped pulse amplification system.

These and other objects of the present invention are now possible using the various embodiments as discussed below, all of which employ at least one chirped Bragg grating to stretch and/or recompress ultrashort pulses. In operation, the pulses are stretched with respect to time, thereby reducing their peak energy before amplification, and subsequently recompressed back to their original, yet amplified shape.

BRIEF DESCRIPTION OF THE DRAWINGS

In order that the invention be fully understood, a preferred embodiment will now be described with reference to the accompanying drawings, in which.

DETAILED DESCRIPTION OF THE PREFERRED EMBODIMENTS

FIG. 1 illustrates the concept of how a chirped Bragg grating 1 spreads an optical pulse 2 or 3 which travels from one end to the other, and is subsequently reflected out of the same end from which it entered. The same grating 1 can also recompress the spread pulses 4 and 5 if they are reflected again back into the grating 1 from the opposite direction. Thus, the process is reversible using the same grating 1.

Figure 2:
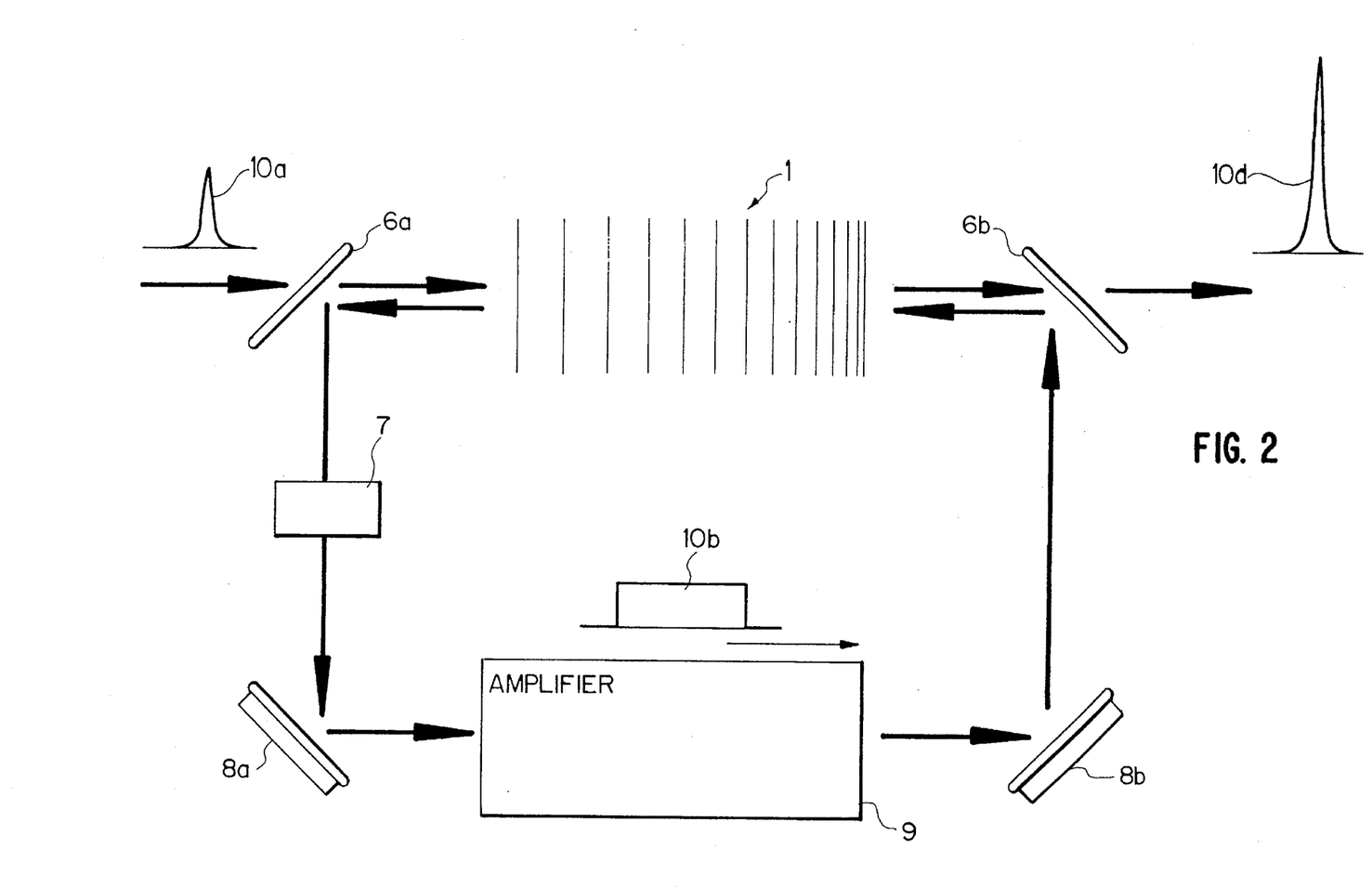
FIG. 2 shows basic arrangement for chirped pulse amplification embodying the present invention.

The basic arrangement for chirped pulse amplification according to the present invention is shown in FIG. 2, where 50:50 beam splitters 6a and 6b are used to separate incoming and reflected beams at each side of the Bragg grating 1, and stretched pulse 10b is amplified in an optical amplifier 9. Because the pulses are stretched, the peak power in the amplifier 9 is kept relatively low, and pulse distortions due to nonlinear and saturation effects in the amplifier 9 are avoided. Therefore, the initial pulse shape and duration can be recovered at much higher than the initial pulse energies.

The advantage of the embodiment shown in FIG. 1 is that the same grating 1 can be used both for stretching and recompressing. Of course, imperfections in the grating 1 (e.g., irregularities in the grating period or variations of the refractive index along the grating 1) will affect the quality of the reflected pulses. However, if the same grating 1 is used for stretching and recompressing, the effect of longitudinal irregularities will be cancelled, and distortion of the recompressed pulses will be minimized.

Figure 3:
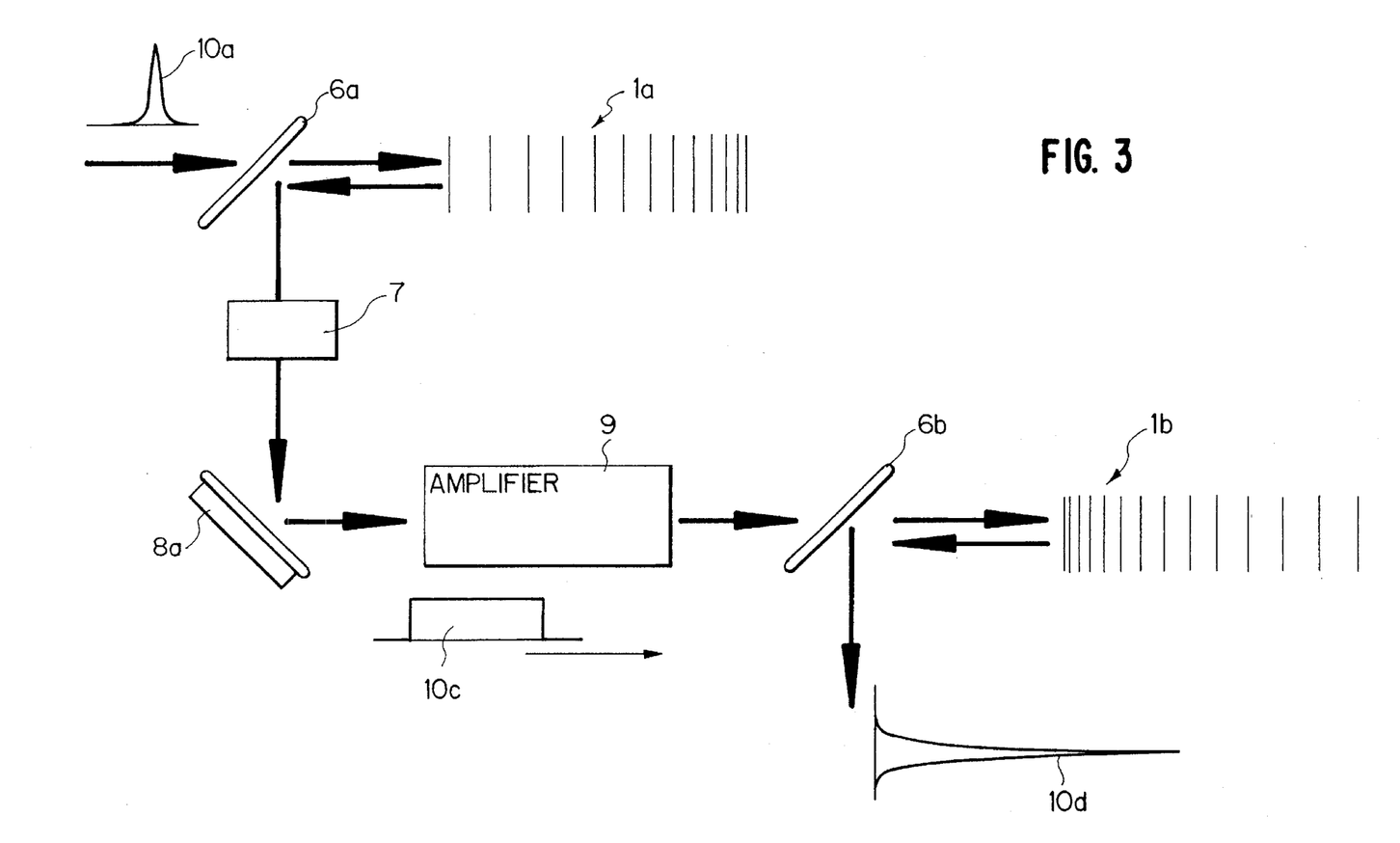
FIG. 3 shows an embodiment of the present invention employing two Bragg gratings.

As shown in FIG. 3, two Bragg grating structures 1a and 1b can also be used separately to stretch and recompress pulses in a chirped amplification system. In this embodiment, the two gratings 1a and 1b should have the same characteristics. In practice, however, some differences between two gratings 1a and 1b will appear during the fabrication process. Therefore, some additional distortions of the recompressed-pulse shape 10d will occur. The duration and shape of the recompressed pulses 10d will be more affected by the differences in two gratings as the initial pulse duration becomes smaller and/or the duration of the stretched pulse 10c becomes longer.

As shown in FIG. 2, the system with a single Bragg grating 1 includes a dispersion compensator 7 to compensate the dispersion of the optical amplifier 9 or any other additional optical components on the path of the optical beam. The system with two gratings 1a and 1b, shown in FIG. 3, can also compensate for the difference of the dispersions of these two gratings 1a and 1b via a dispersion compensator 7. Such dispersion compensation can be achieved using, e.g., a suitable material, a waveguide structure, or an optical fiber with positive or negative dispersion (whichever is required in a particular system). This would allow the system to attain bandwidth limited pulses at the output of the system even with femtosecond optical pulses.

Figure 4A:
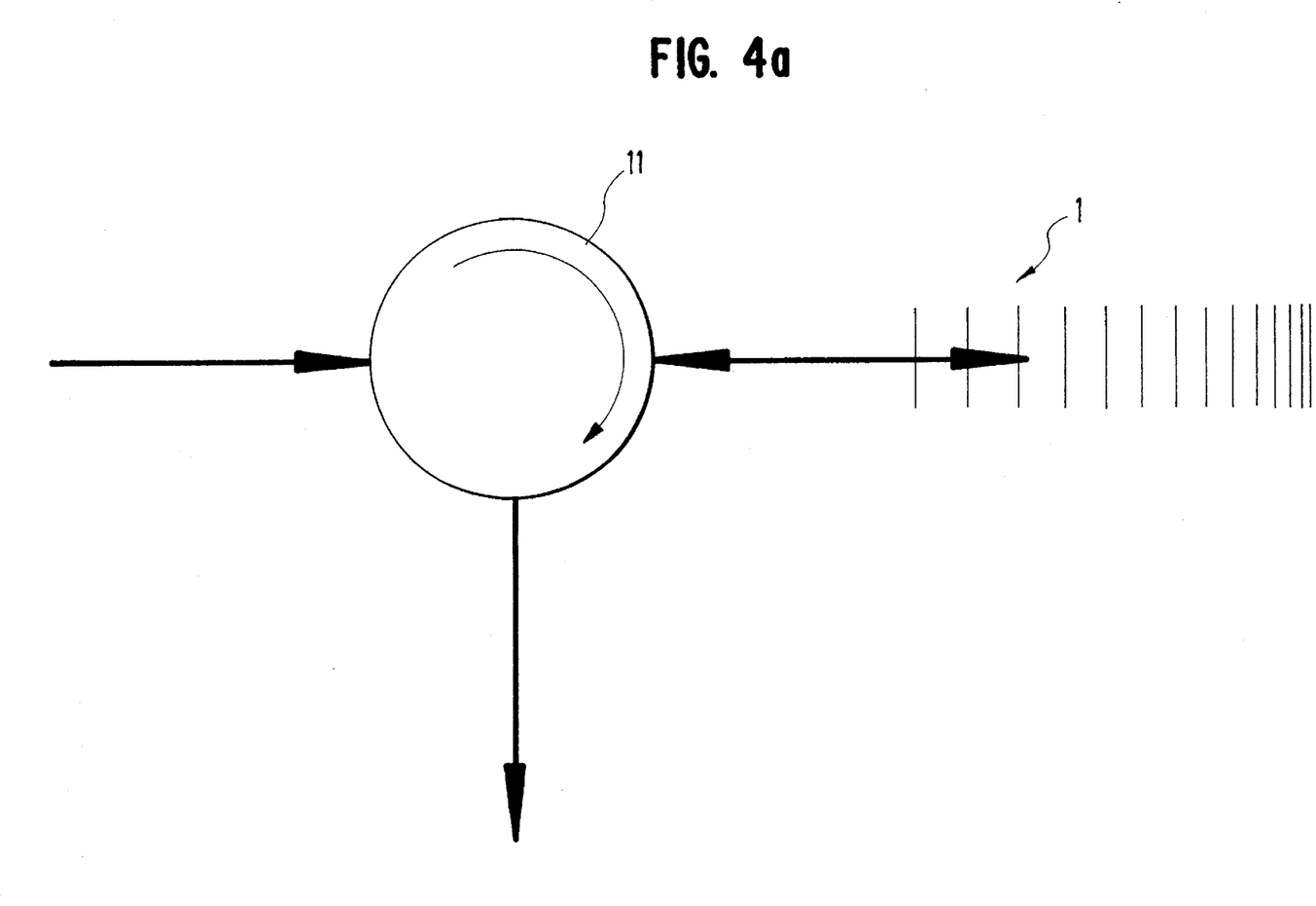
FIG. 4a shows an embodiment of the present invention employing an optical circulator to enhance pulse energy.

In the examples given in FIG. 2 and FIG. 3, 50:50 beamsplitters 6a and 6b were used as means for separating incident and reflected waves from the Bragg gratings 1a and 1b. Although this embodiment can be easily implemented using partially reflecting mirrors or 4-port fiber couplers, only up to 25% of the pulse energy will remain after stretching or compression. Other solutions are possible to maximize the energy throughput. For example, an optical circulator 11, as shown in FIG. 4a, allows up to 100% of the pulse energy to pass through.

Figure 4B:
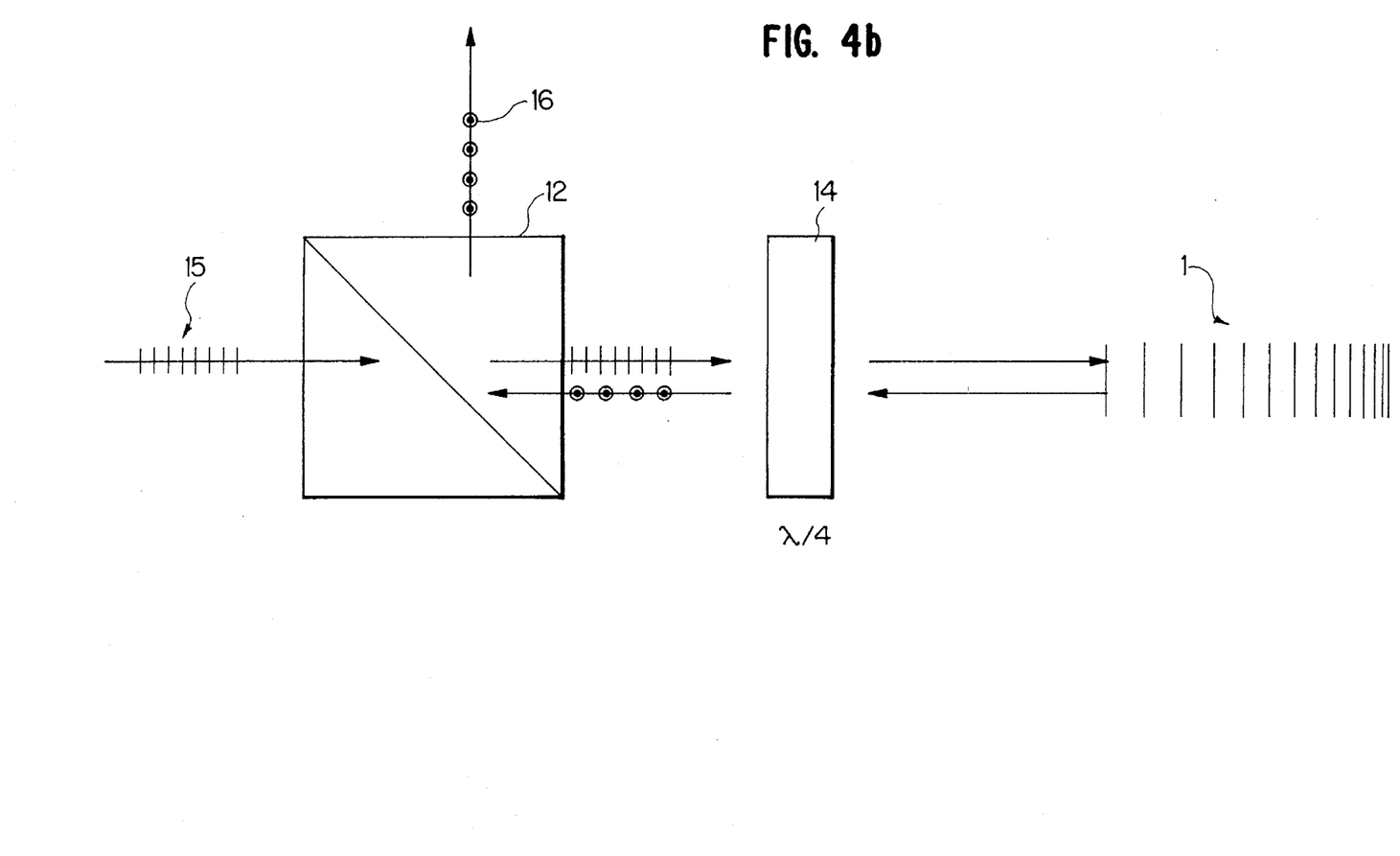
FIG. 4b shows an embodiment of the present invention employing a polarizing beam splitter and λ/4 waveplate.

The arrangement in FIG. 4b uses a polarizing beamsplitter 12 and a λ/4 waveplate 14 to obtain nearly 100% transmittance. Linearly polarized light 15 with a polarization direction in a parallel plane will pass the polarizing beamsplitter 12 without any large loss. Reflected light 16 from the grating passes the λ/4 waveplate 14 twice, thereby acquiring an orthogonal polarization with respect to the input beam, and will thus be reflected by the beamsplitter 12.

Polarizing beamsplitters 12 are particularly useful when only one Bragg grating 1 is used to stretch and recompress. A small fraction of light will always be transmitted through the distant end of the grating 1, hence with only one grating 1, it becomes particularly necessary to prevent this transmitted pulse from being amplified in the amplifier 9. With the use of polarizing beams splitters 12, this can be easily attained by orienting the polarizing beamsplitters 12 at each end of the grating 1 (and the polarizations of the corresponding input beams) orthogonal to each other. The transmitted light in a beamsplitter 12 will then have orthogonal polarization with respect to the reflected light and will not be deflected by the beamsplitter 12.

Figure 5A:
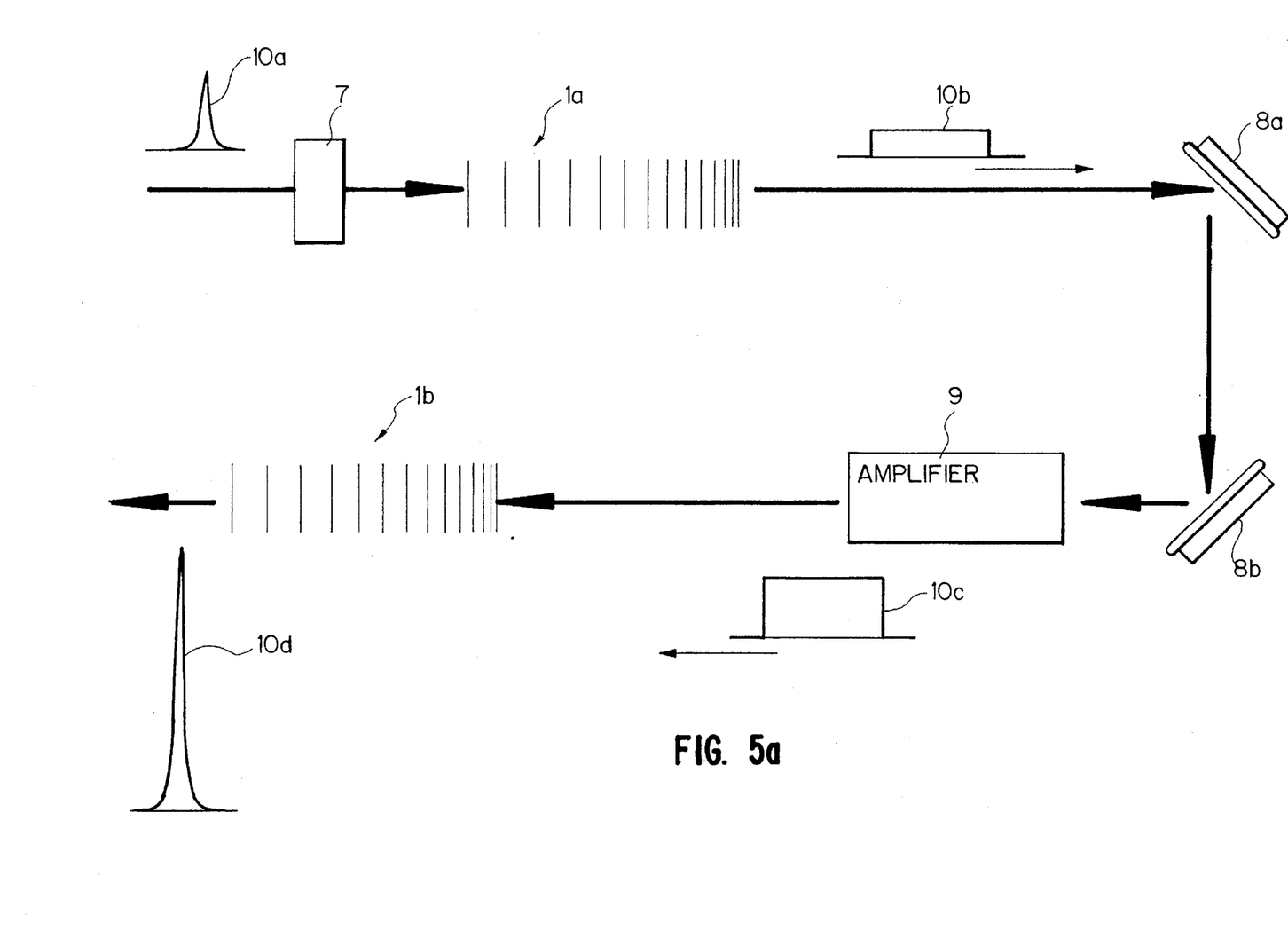
FIG. 5a shows an embodiment of the present invention employing two in-line Bragg gratings.

FIG. 5a shows one of the many different variations in the use of Bragg gratings 1a and 1b in chirped-pulse amplification systems in accordance with the present invention. In Ouellette, *Optics Letters*, Vol. 16, No. 5, March 1991, p. 303, it was shown that in-waveguide or in-fiber chirped gratings can be designed to work in transmission by coupling stretched/compressed pulses into a waveguide mode which is different than that of the input pulse. Gratings 1a and 1b simplify the system, however, additional known means (not shown) would generally be added to suppress the residual amplified uncompressed pulse 10c which can be transmitted together with the compressed pulse 10d. It is also possible to simplify the system using other known types of dispersive delay lines in combination with one Bragg grating 1.

Figure 5B:
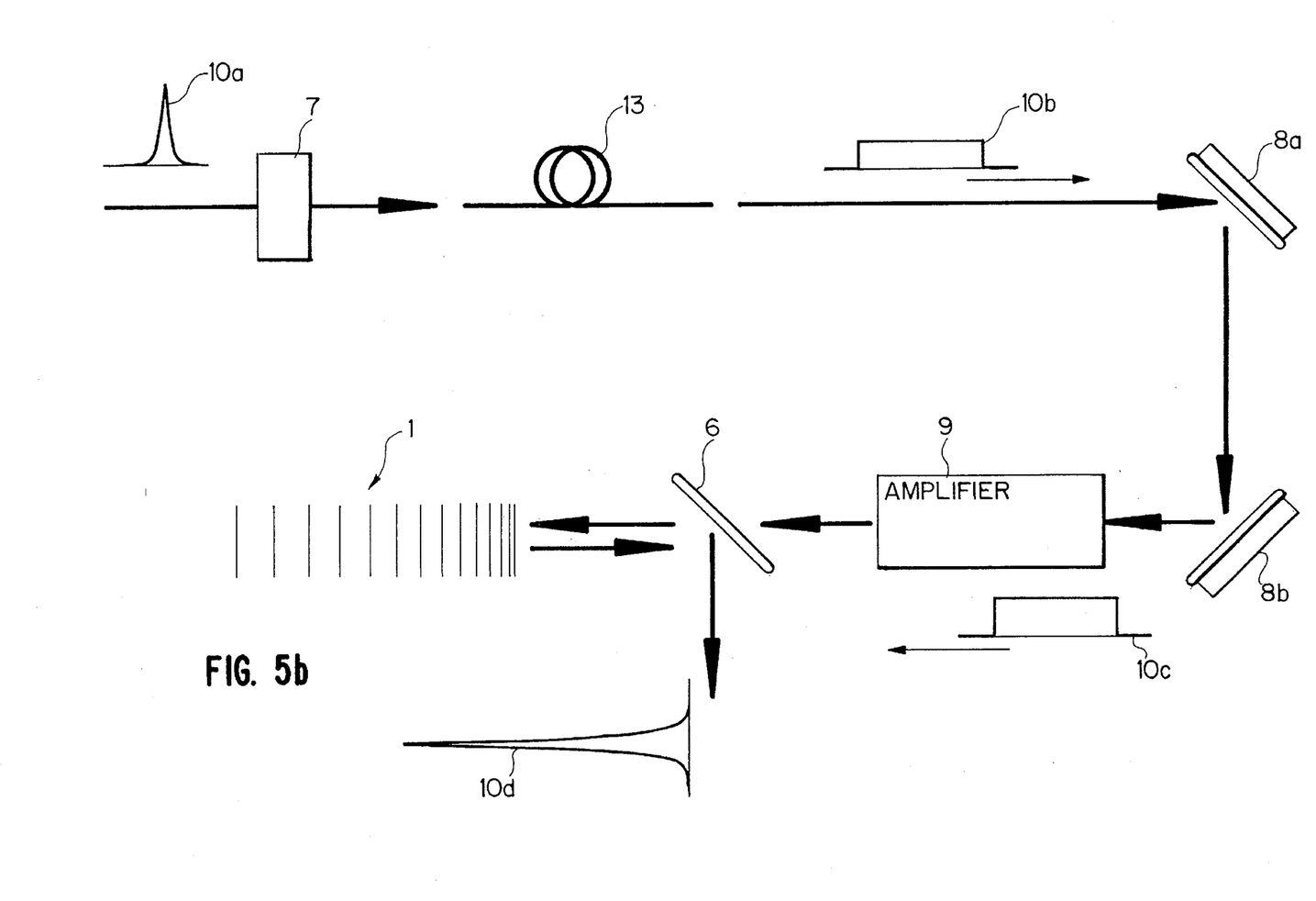
FIG. 5b shows an embodiment of the present invention employing a single grating and standard fiber as a stretcher.
Figure 5C:
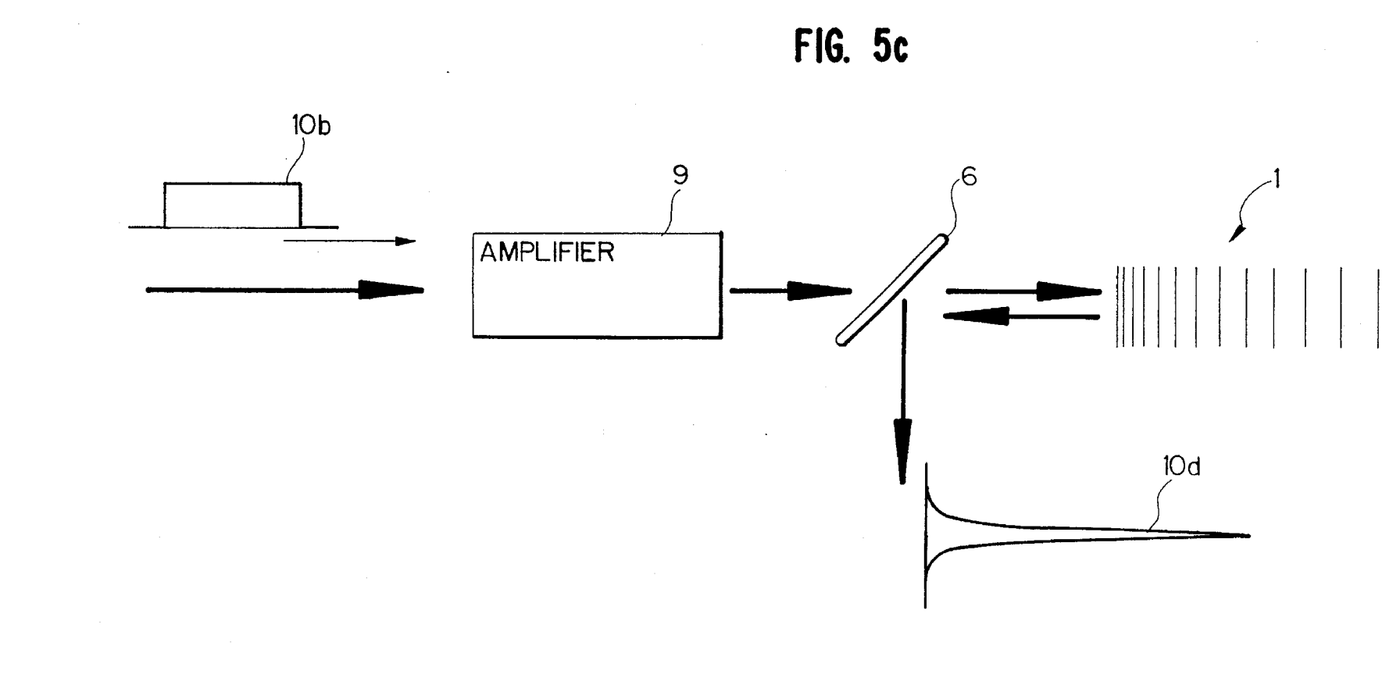
FIG. 5c shows an embodiment of the present invention for amplifying chirped long pulses.

FIG. 5b shows an example of using standard fiber 13 as a stretcher and an in-fiber grating 1 as a compressor. In chirped pulse amplification systems where chirped long pulses are generated directly from a laser source, there is a need only for a Bragg compressor 1, as shown in FIG. 5c.

Figure 6:
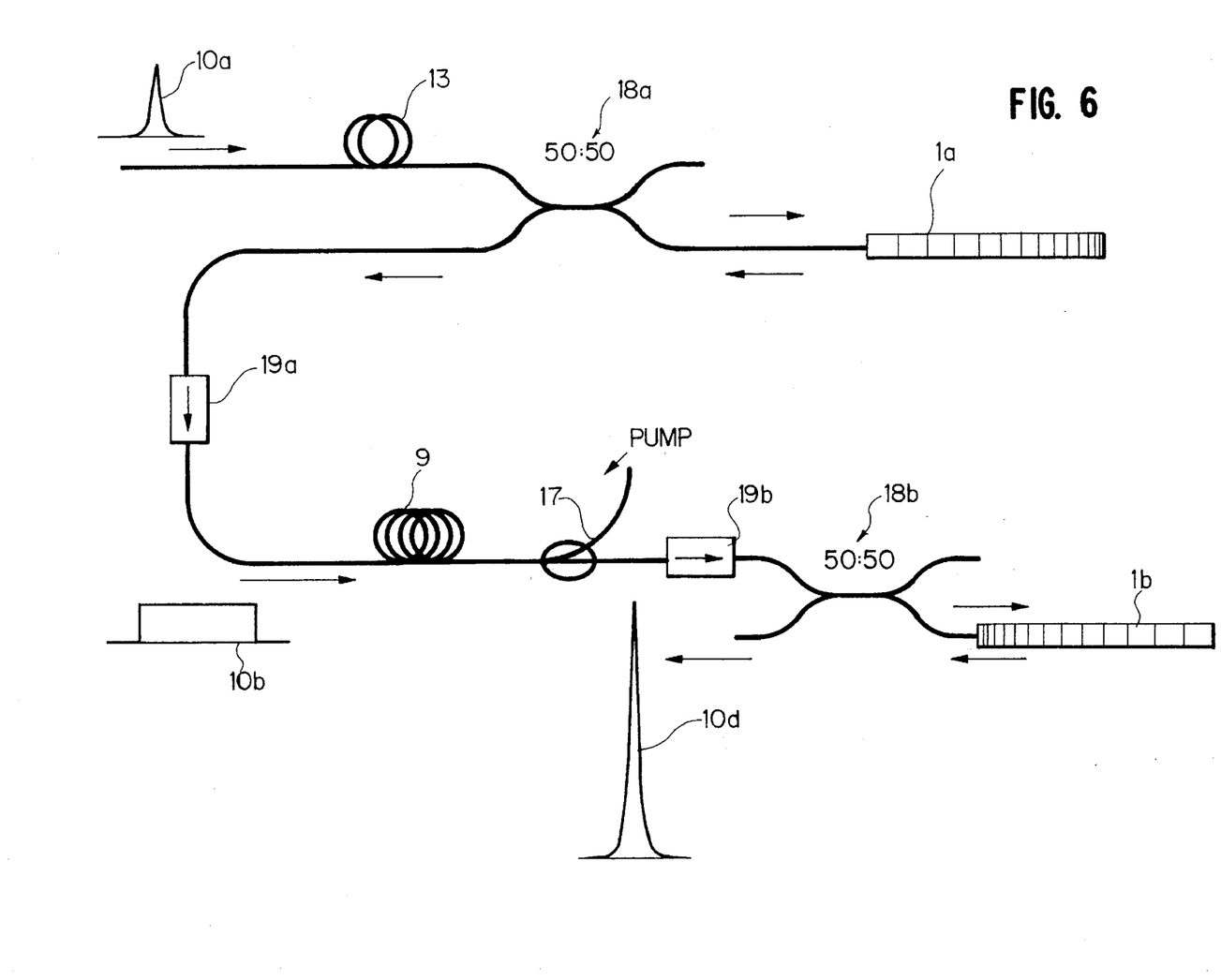
FIG. 6 shows an embodiment of the present invention used for testing.

FIG. 6 shows an embodiment of the present invention including two chirped Bragg in-fiber gratings 1a and 1b.

Femtosecond pulses were generated with a passively mode-locked fiber laser (not shown). Initial pulses 10a had a 330 fs bandwidth-limited duration and a repetition rate of 8 MHz. Bragg gratings 1a and 1b were used where the chirp was produced by fiber deformation during exposure. The gratings 1a and 1b were 5 mm long, and had a reflection bandwidth of 20 nm and a reflectivity of 65%. Femtosecond pulses 10a were stretched to 30 ps by grating 1a. Stretched pulses 10b were amplified in an erbium-doped fiber amplifier. The amplifier was pumped with ~200 mW at 980 nm from a laser diode MOPA 17. To minimize the dispersion, a 4.5 m long erbium-doped fiber 13 with about 6 times lower negative dispersion than the standard fiber (D≈−3 ps/nm-km) was used as the amplifier 9. To compensate the effect of negative dispersion of all the fibers in the path of the beam, a 70 cm length of positively dispersive optical fiber 13 (D=86 ps/nm-km) was spliced at the beginning of the system. Incident and reflected beams at one end of the fiber grating were separated using standard 50:50 fiber couplers 18a and 18b. Throughput of the energy including losses in the grating was 16% both for stretching and recompressing. The energy of stretched pulses at the input of the amplifier was 20 pJ. The gain of the amplifier was maximized by arranging pump and signal beams to propagate in opposite directions and by using two in-fiber optical isolators 19a and 19b at both ends of the amplifier 9 to prevent back reflections. The energy of pulses at the end of the amplifier 9 was 4–6 nJ.

To verify that more energy can be recovered after stretching and recompressing, the arrangement shown in FIG. 4b was tested, using bulk components. In this embodiment, energy throughput was increased to 50%. The remaining 3 dB losses were caused by limited reflectivity of the Bragg grating 1 used and by 80% coupling efficiency into the grating fiber. Much higher throughput can be achieved by using gratings with higher reflectivity and all-fiber polarization components in the FIG. 4b arrangement.

Figure 7A:
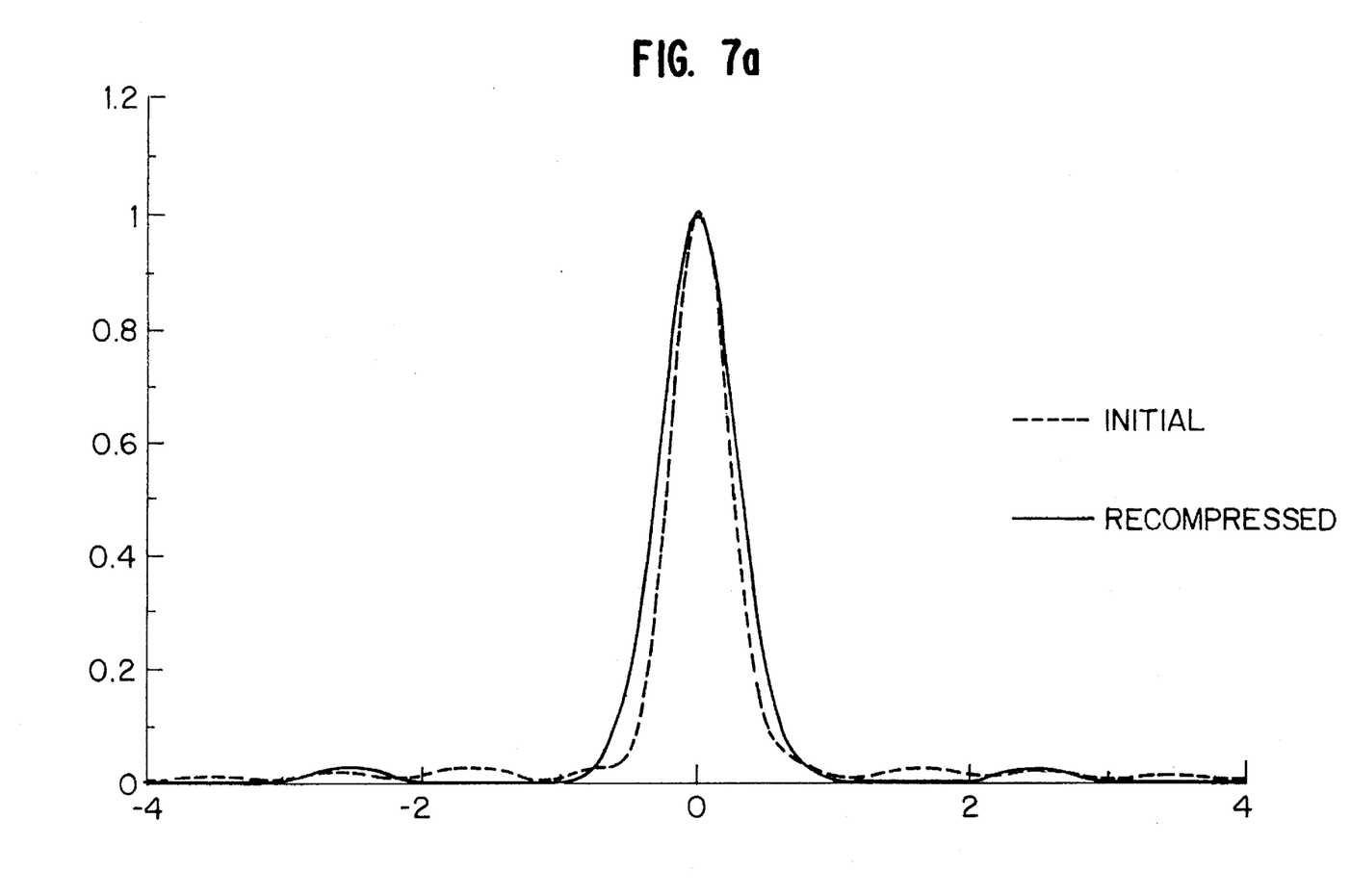
FIG. 7a is a graphical representation of the signal processing performed by the embodiment shown in FIG. 6.
Figure 7B:
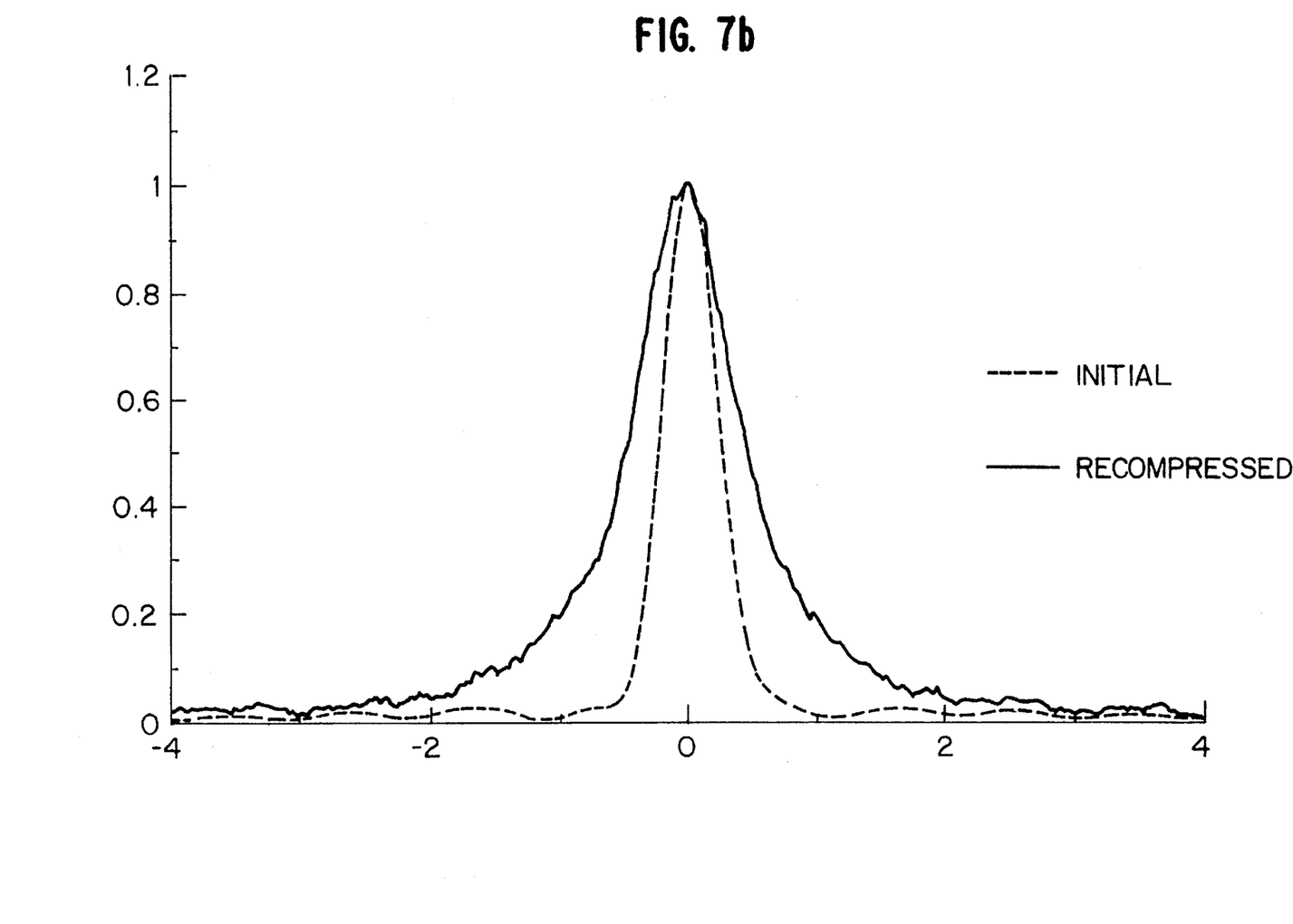
FIG. 7b is a graphical representation of the signal processing performed by a system using a fiber stretcher and Bragg grating compressor.

Embodiments with a single Bragg grating 1 for stretching and recompressing, and with a standard fiber stretcher 13 instead of the first Bragg grating (as in FIG. 5b), were also constructed; experimental results are presented in FIGS. 7a and 7b, respectively. Using two propagation directions in a single chirped Bragg grating for stretching and recompressing, 408 fs recompressed pulses were obtained for 330 fs bandwidth limited initial pulses. Thus, the grating arrangement increased the pulse width by only 20%. As shown in FIG. 7a, the pulse shape after recompression here remained essentially the same as at the input of the system. This is considerably better than the typical results with diffraction grating stretchers and compressors. When the standard fiber stretcher 13 was used (170 m of standard optical fiber; D=17 ps/nm-km), the shortest recompressed pulse was 544 fs, and the pulse shape was significantly altered (FIG. 7b).

An important advantage of using Bragg gratings for stretching and recompression is that they have small dimensions. To stretch femtosecond pulses to the duration of hundreds of picoseconds, only a few-centimeter long grating is required (compared to ~1 m required for a bulk diffraction grating stretcher). Due to this short interaction length, high pulse energies can be reached in a Bragg compressor. Also, in a volume Bragg grating, beam size can be large and high peak intensities can be avoided. Chirped Bragg gratings can be designed to work at any wavelength, and high energy throughput can be reached. Bragg reflection is in general polarization insensitive. However, birefringence of materials and waveguiding structures used can cause some polarization sensitivity. Distortions of the beam quality introduced by Bragg gratings in general can be avoided. In-waveguide and in-fiber structures are particularly attractive for use in all-fiber, all-waveguide or hybrid fiber-waveguide-semiconductor laser designs offering robust, reliable and cost effective systems for chirped pulse amplification.

Therefore, the present invention successfully achieves its objectives by providing a compact diode-laser and fiber source of high-energy ultrashort pulses. The pulse energy can be much higher than for previous systems, and amplification distortion of the resultant pulse can be substantially reduced.

The invention is not limited to the embodiments described above, but all changes and modifications thereof not constituting departure from the spirit and scope of the invention are intended to be included.

What is claimed is:

1. An apparatus for amplifying an optical pulse, comprising:

generating means for generating an optical pulse;

spreading means, optically connected to said generating means, for reducing the peak amplitude of said optical pulse and increasing the duration of said optical pulse;

amplifying means, optically connected to said spreading means, for increasing the amplitude of said optical pulse after said optical pulse is output from said spreading means; and recompressing means, optically connected to the output of said amplifying means, for decreasing the duration of said optical pulse after said optical pulse is output from said amplifying means;

wherein at least one of said spreading and recompressing means comprises a chirped Bragg grating.

2. An apparatus in accordance with claim 1, wherein said spreading means and said recompressing means comprise the same chirped Bragg grating.

3. An apparatus in accordance with claim 1, wherein said spreading means comprises a spreading chirped Bragg grating and said recompressing means comprises a recompressing chirped Bragg grating.

4. An apparatus in accordance with claim 1, further comprising:
dispersion compensating means, for reducing residual optical wave dispersion in said optical pulses.

5. An apparatus in accordance with claim 2, further comprising:
dispersion compensating means, for reducing residual optical wave dispersion in said optical pulses.

6. An apparatus in accordance with claim 3, further comprising:
dispersion compensating means, for reducing residual optical wave dispersion in said optical pulses.

7. An apparatus in accordance with claim 1, further comprising:
beamsplitting means, optically connected to at least one of said chirped Bragg gratings, for separating optical pulses which are incident on said chirped Bragg gratings from optical pulses which are reflected from said chirped Bragg gratings.

8. An apparatus in accordance with claim 2, further comprising:
beamsplitting means, optically connected to at least one of said chirped Bragg gratings, for separating optical pulses which are incident on said chirped Bragg gratings from optical pulses which are reflected from said chirped Bragg gratings.

9. An apparatus in accordance with claim 3, further comprising:
beamsplitting means, optically connected to at least one of said chirped Bragg gratings, for separating optical pulses which are incident on said chirped Bragg gratings from optical pulses which are reflected from said chirped Bragg gratings.

10. A method of amplifying optical pulses comprising the steps of:
providing an optical pulse;
spreading the duration of said optical pulse over a period of time longer than the original duration of said optical pulse, while reducing the peak amplitude of said optical pulse to create a spread pulse;
amplifying said spread pulse to create an amplified spread pulse; and
recompressing said amplified spread pulse to the original shape of said optical pulse;
wherein at least one of said spreading and recompressing steps is accomplished using a chirped Bragg grating.

11. A method in accordance with claim 10, wherein both of said spreading and recompressing steps are accomplished using a single chirped Bragg grating.

12. A method in accordance with claim 10, wherein said spreading and recompressing steps are accomplished using separate chirped Bragg gratings.

13. A method in accordance with claim 6, further comprising the step of:
processing said optical pulse to reduce optical wave dispersion.

14. A method in accordance with claim 11, further comprising the step of: processing said optical pulse to reduce optical wave dispersion.

15. A method in accordance with claim 12, further comprising the step of: processing said optical pulse to reduce optical wave dispersion.

16. A method in accordance with claim 10, further comprising the step of: separating optical pulses which are incident on said chirped Bragg gratings from optical pulses which are reflected from said chirped Bragg gratings.

17. A method in accordance with claim 11, further comprising the step of: separating optical pulses which are incident on said chirped Bragg gratings from optical pulses which are reflected from said chirped Bragg gratings.

18. A method in accordance with claim 12, further comprising the step of: separating optical pulses which are incident on said chirped Bragg gratings from optical pulses which are reflected from said chirped Bragg gratings.

* * * * *